(12) United States Patent
Liu (10) Patent No.: US 11,490,226 B2
(45) Date of Patent: Nov. 1, 2022

(54) WIRELESS DEVICE AND POSITIONING METHOD

(71) Applicant: ACCTON TECHNOLOGY CORPORATION, Hsinchu (TW)

(72) Inventor: I-Ru Liu, Taipei (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 93 days.

(21) Appl. No.: 16/988,715

(22) Filed: Aug. 10, 2020

(65) Prior Publication Data
US 2021/0067913 A1 Mar. 4, 2021

(30) Foreign Application Priority Data
Aug. 28, 2019 (TW) .................. 108130880

(51) Int. Cl.
*H04W 4/029* (2018.01)
*G01S 5/10* (2006.01)
*H04W 4/33* (2018.01)

(52) U.S. Cl.
CPC ............. *H04W 4/029* (2018.02); *G01S 5/10* (2013.01); *H04W 4/33* (2018.02); *G01S 2205/02* (2020.05)

(58) Field of Classification Search
CPC .......... H04W 4/029; H04W 4/33; G01S 5/10; G01S 2205/02; G01S 3/043; G01S 3/48
See application file for complete search history.

(56) References Cited

U.S. PATENT DOCUMENTS

| 7,567,213 B2 | 7/2009 | Liu |
| 7,613,482 B2 | 11/2009 | Liu |
| 8,179,319 B1 | 5/2012 | Francis et al. |
| 2014/0009347 A1* | 1/2014 | Bertin .................... H01Q 21/24 343/725 |

FOREIGN PATENT DOCUMENTS

TW  I322530 B  3/2010

* cited by examiner

*Primary Examiner* — Kabir A Timory
(74) *Attorney, Agent, or Firm* — CKC & Partners Co., LLC (57) ABSTRACT

A wireless device includes an antenna circuit and a controller. The antenna circuit includes a plurality of antennas. Each of the plurality of antennas is configured to surround a reference point and arrange with an equal interval between each other. The controller is coupled to the antenna circuit and configured to compute a strength of a signal of each of the plurality of antennas to choose a plurality of indicated antennas from the plurality of antennas; compute the signal of each two of the plurality of indicated antennas to obtain a plurality of composite signals; and compute a plurality of phase angles according to the plurality of composite signals to compute a positioning angle by using the plurality of phase angles.

6 Claims, 5 Drawing Sheets

WIRELESS DEVICE AND POSITIONING METHOD

CROSS-REFERENCE TO RELATED APPLICATION

This application claims priority to and the benefit of Taiwan Application Serial Number 108130880, filed on Aug. 28, 2019, the entire content of which is incorporated herein by reference as if fully set forth below in its entirety and for all applicable purposes.

BACKGROUND

Field of Disclosure

The disclosure generally relates to an antenna and a method for an antenna, and more particularly, to a positioning method for a wireless device using an antenna.

Description of Related Art

The wireless communication technology is applied for services related to the indoor location-based service (LBS). The wireless communication technology is, for example, Wi-Fi, Bluetooth, infrared ray, ZigBee, and so on. The base station monitors the signal strength based on the received signal strength indication (RSSI) to determine the distance between the current position and the signal source. However, the distance measurement based on the RSSI information is not precise, and the distance measurement is easily influenced by the environmental factors so that the measured distance is not accurate.

On the other hand, the indoor location-based service is affected by the antenna configuration. For example, in the case that the antenna configuration is linear, only the signal in some specific direction can be measured, such that the location-based service is restricted.

Subsequently, there is a measurement problem with the current positioning technique. Therefore, it is desirable to have a solution for improving the measuring accuracy.

SUMMARY

One aspect directed towards a wireless device that includes an antenna circuit and a controller. The antenna circuit includes a plurality of antennas. Each of the plurality of antennas is configured to surround a reference point and arrange with an equal interval between each other. The controller is coupled to the antenna circuit and configured to compute a strength of a signal of each of the plurality of antennas to choose a plurality of indicated antennas from the plurality of antennas; compute the signal of each two of the plurality of indicated antennas to obtain a plurality of composite signals; and compute a plurality of phase angles according to the plurality of composite signals to compute a positioning angle by using the plurality of phase angles.

One aspect directed towards a positioning method that is configured for a plurality of antennas surrounding a reference point and arranging with an equal interval between each other. The positioning method includes the operations of: computing a strength of each of the plurality of antennas to choose a plurality of indicated antennas from the plurality of antennas; computing the signal of each two of the plurality of indicated antennas to obtain a plurality of composite signals; and computing a plurality of phase angles according to the plurality of composite signals to compute a positioning angle by using the plurality of phase angles.

It is to be understood that both the foregoing general description and the following detailed description are by examples, and are intended to provide further explanation of the disclosure as claimed.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
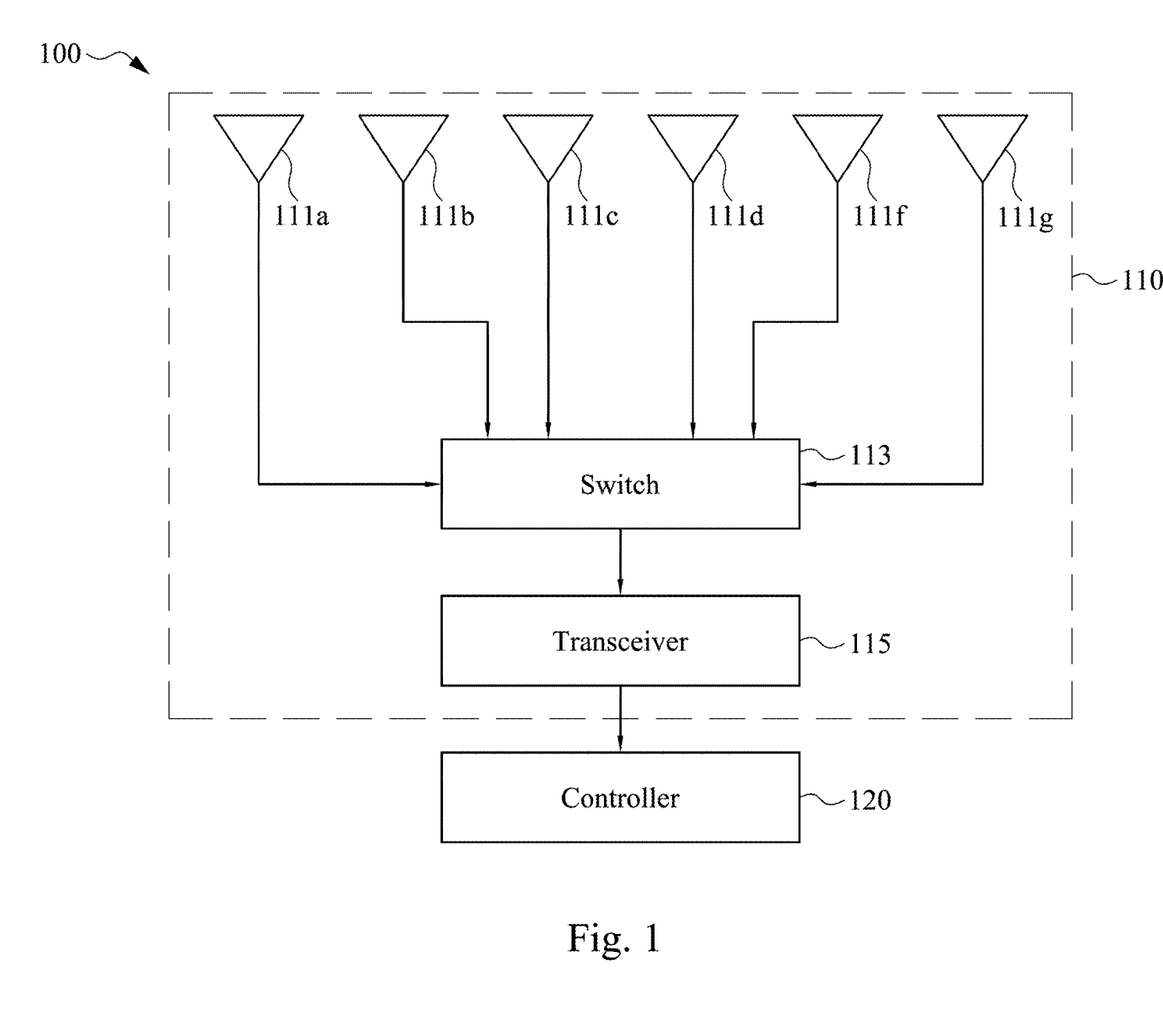
FIG. 1 is a block diagram illustrating a wireless device according to some embodiments of the present disclosure.

Reference is made to FIG. 1, which is a block diagram illustrating a wireless device 100 according to some embodiments of the present disclosure. The wireless device 100 includes an antenna circuit 110 and a controller 120. The antenna circuit 110 includes antennas 111a-111g. The antennas 111a-111g are configured to receive a wireless radio frequency signal.

In some embodiments, the antenna circuit 110 further includes a switch 113 and a transceiver 115. The switch 113 is coupled to the antennas 111a-111g and the transceiver 115. The switch 113 is configured to switch and receive signals of the antennas 111a-111g. The signals are transmitted through the transceiver 115 to the controller 120.

The controller 120 is coupled to the antenna circuit 110. In some embodiments, the controller 110 is configured to execute a positioning method in FIG. 3 which is described hereinafter.

Figure 2:
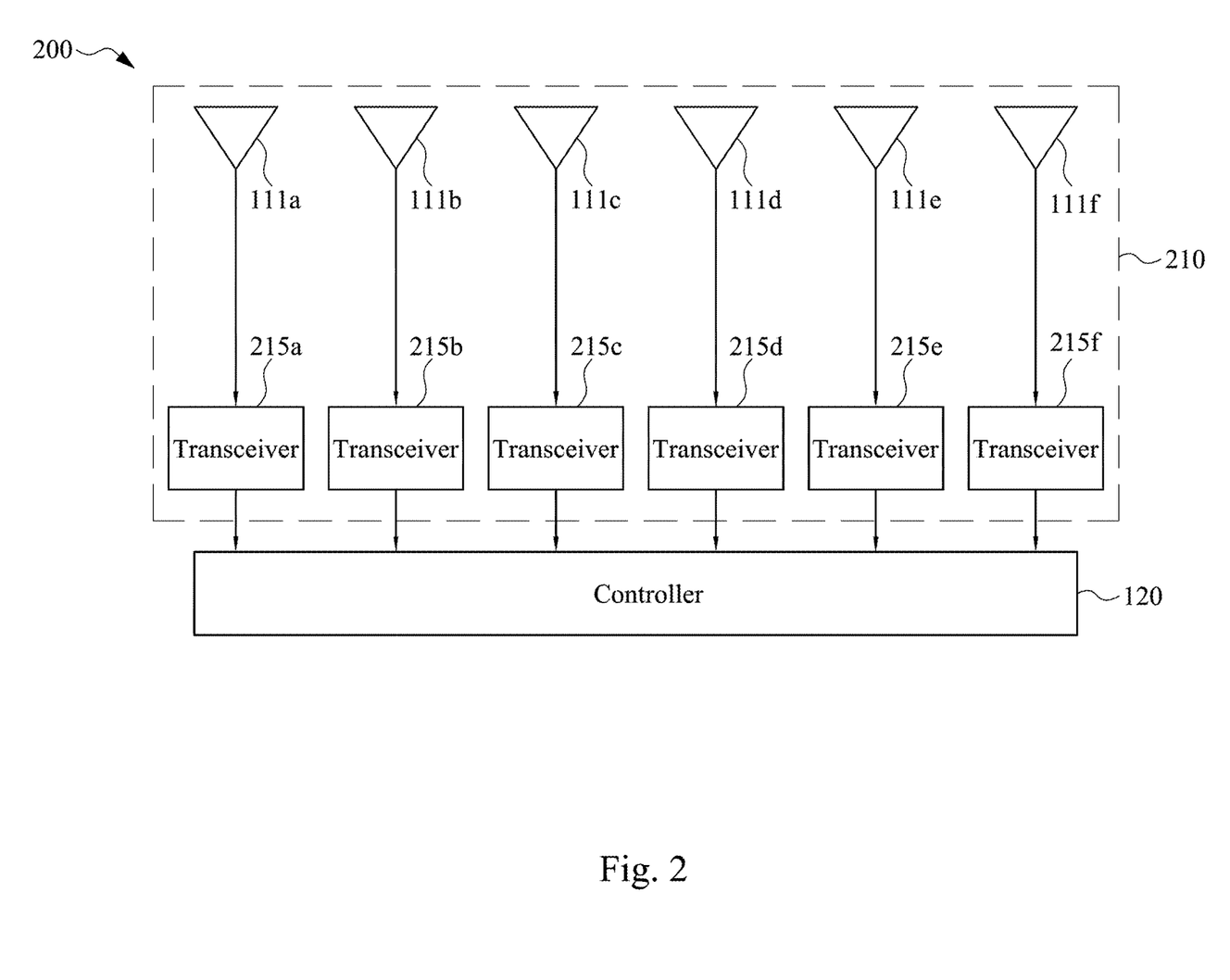
FIG. 2 is a block diagram illustrating a wireless device according to some other embodiments of the present disclosure.

Reference is made to FIG. 2, which is a block diagram illustrating a wireless device 200 according to some other embodiments of the present disclosure. The elements of the wireless device 200 having the same number as that of the elements of the wireless device 100 in FIG. 1, so the elements of the wireless device 200 having the same numbers as that of the elements of the wireless device 100 in FIG. 1 are omitted herein for the sake of brevity. The part in FIG. 2 which is different from that part in FIG. 1 is described herein.

As shown in FIG. 2, the wireless device 200 includes an antenna circuit 210 and a controller 120. The antenna circuit 210 is coupled with the controller 120. The antenna circuit 210 includes the antennas 111a-111g and transceivers 215a-215f. The antenna 111a is coupled to the transceiver 215a. The antenna 111b is coupled to the transceiver 215b. The antenna 111c is coupled to the transceiver 215c. The antenna 111d is coupled to the transceiver 215d. The antenna 111e is coupled to the transceiver 215e. The antenna 111f is coupled to the transceiver 215f. The transceivers 215a-215f receive the signals of the antenna 111a-111g simultaneously, and the controller 120 can process the signals at the same time.

It should be noted that the six antennas are taken as examples for the wireless device 100 in FIG. 1 and the wireless device 200 in FIG. 2. In some other embodiments, the number of antennas of the wireless device 100 and the number of antennas of the wireless device 200 is the same as the edge number of a regular polygon. For example, the number of antennas of the wireless device 100 and the wireless device 200 can be three antennas, four antennas, eight antennas, ten antennas, twelve antennas, and so on. The number of antennas is not limited to six antennas in the present disclosure.

Figure 3:
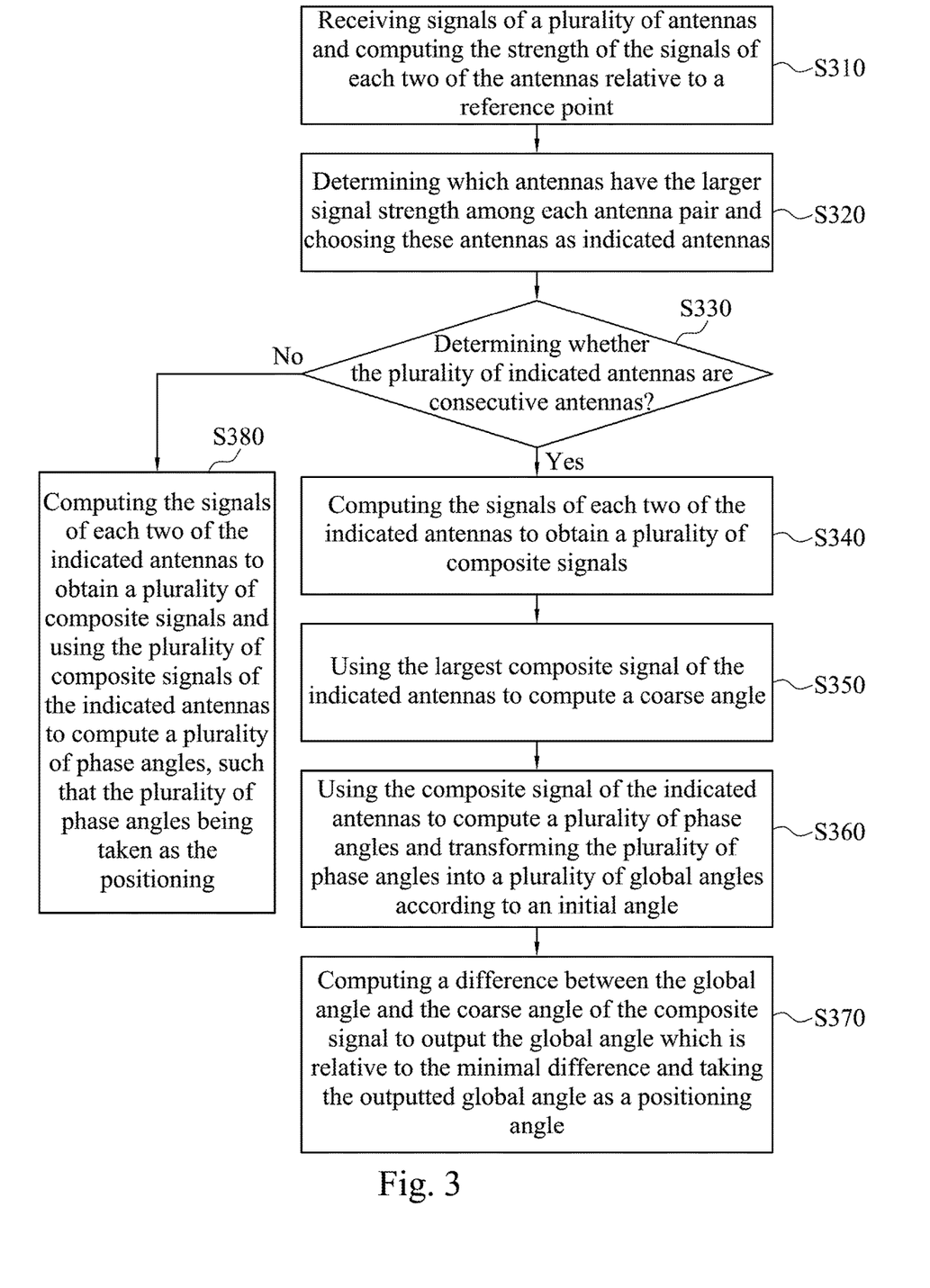
FIG. 3 is a flow chart illustrating a positioning method according to some embodiments of the present disclosure.

Reference is made to FIG. 3, which is a flow chart illustrating a positioning method 300 according to some embodiments of the present disclosure. The positioning method 300 is configured for the wireless device 100 and the wireless device 200 which has multiple circular-arranged antennas.

Figure 4:
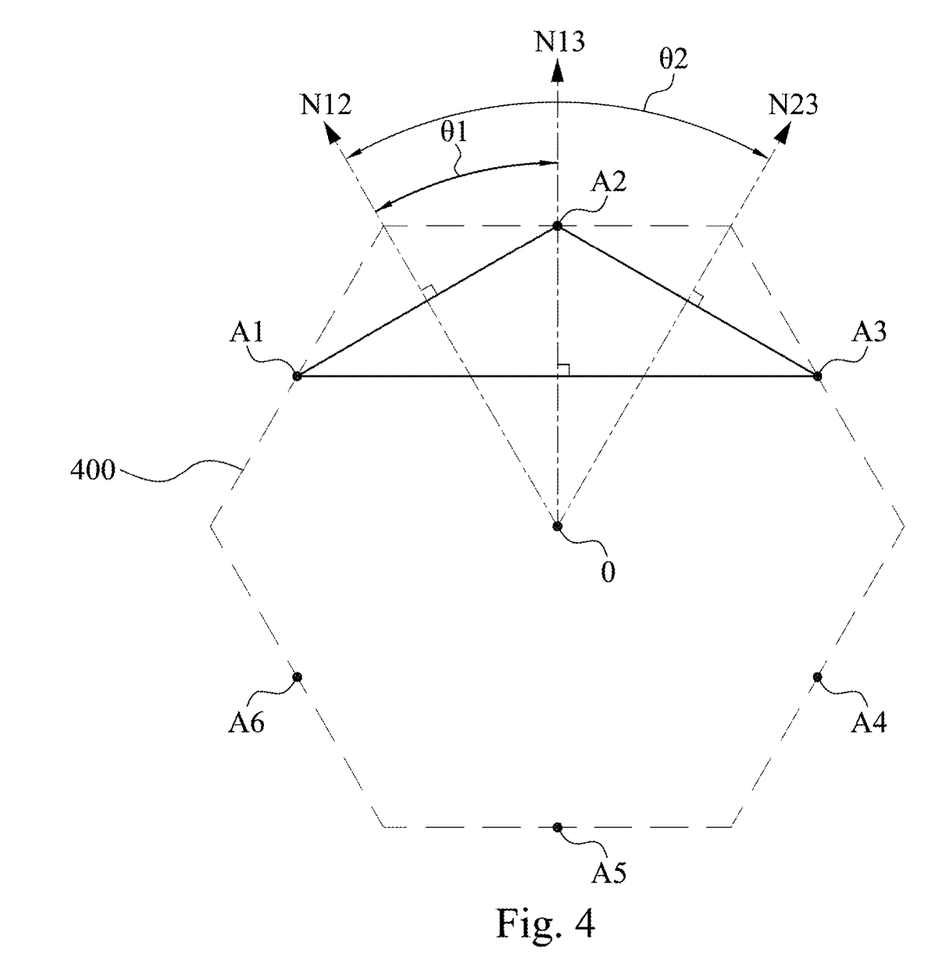
FIG. 4 is a block diagram illustrating an antenna arrangement that the antennas execute the positioning method in FIG. 3 according to some embodiments of the present disclosure.

For clarifying the description of the circular arrangement of the antennas, reference is made to FIG. 4, which is a block diagram illustrating an antenna arrangement that the antennas execute the positioning method 300 in FIG. 3 according to some embodiments of the present disclosure. The antenna arrangement in FIG. 4 includes six circular-arranged antennas. A regular hexagon 400 includes six edges and a reference point O, and the length of each edge of the regular hexagon 400 is $\lambda/2$. The circular arrangement represents that each of the antennas A1-A6 is disposed at a center point of the edge of the regular hexagon 400 respectively. The antennas A1-A6 surround the reference point O and arrange with an equal interval between each other to form the circular arrangement. The distances between any two adjacent antennas in the regular hexagon 400 are equal and the distances between any antenna and the reference point O are equal because of the characteristic of the regular hexagon 400. For example, the distances between the antenna A1 and A2, the antenna A2 and A3, the antenna A3 and A4, the antenna A4 and A5, the antenna A5 and A6, and the antenna A6 and A1 are equal. Similarly, the distances between the antenna and the reference point O are equal. For example, the distances between the antenna A1 and the reference point O, the antenna A2 and the reference point O, the antenna A3 and the reference point O, the antenna A4 and the reference point O, the antenna A5 and the reference point O, and the antenna A6 and the reference point O are equal.

It should be noted that the distance between any two antennas is called a baseline length.

In some embodiments, based on the feature of the regular hexagon 400, the baseline length between two consecutive antennas is $0.433\lambda$. That is, the baseline length of the antenna A1 and the antenna A2 (i.e., the distance between the antenna A1 and the antenna A2), the baseline length of the antenna A2 and the antenna A3, the baseline length of the antenna A3 and the antenna A4, the baseline length of the antenna A4 and the antenna A5, the baseline length of the antenna A5 and the antenna A6, and the baseline length of the antenna A6 and the antenna A1 is $0.433\lambda$.

The baseline length between the antennas, which is spaced one-hop, is $0.75\lambda$. For example, the baseline length of the antenna A1 and the antenna A3 (i.e., the distance between the antenna A1 and the antenna A3), and the baseline length of the antenna A1 and the antenna A5 is $0.75\lambda$, respectively.

It should be noted that, based on the feature of the baseline length between the antennas, when the baseline length between two antennas is smaller than $0.5\lambda$, only one result (i.e., only one phase angle) can be computed according to a composite signal formed by the two antennas with the baseline length which is smaller than $0.5\lambda$. On the other hand, when the baseline length between two antennas is not smaller than $0.5\lambda$, multiple results (i.e., multiple phase angles) can be computed according to the composite signal formed by the two antennas with the baseline length which is not smaller than $0.5\lambda$. As shown in FIG. 4, the antennas A1-A6 are configured to have the baseline length (i.e., between the antennas A1 and A2, the antennas A2 and A3, ..., the antennas A6 and A1) which is smaller than $0.5\lambda$. Therefore, the only one phase angle can be computed based on the composite signal formed by two consecutive antennas.

Each operation of the positioning method 300 in FIG. 3 is performed by the controller 120 in FIG. 1 and FIG. 2. The antenna configuration in FIG. 4 is described below.

In operation S310, the controller 120 receives signals of the plurality of antennas A1-A6 and computes the strength of the signals of each two of the antennas A1-A6 which are located on the opposite sides with each other relative to the reference point O. For the three antenna pairs, the antennas of each pair are located on the opposite sides with each other relative to the reference point O. For example, the antennas A1 and A4, the antennas A2 and A5, and the antennas A3 and A6 are located on the opposite sides with each other. The controller 120 receives the signals of these antennas and computes the signal strength according to formula 1 and formula 2 respectively.

$$\text{Amplitude} = \sqrt{I^2 + Q^2} \quad \text{(formula 1)}$$

$$\text{Strength} = \text{Amplitude}^2/\text{Resistance} \quad \text{(formula 2)}$$

In formula 1, the variable I is the real part signal of the antenna signal, and the variable Q is the imaginary part of the antenna signal. In formula 2, the variable Amplitude is the amplitude value obtained from formula 1, and the variable Resistance is the resistance value of the antenna. In some embodiments, the controller 120 searches a lookup table according to the value I and the value Q to obtain the amplitude value in formula 1. Accordingly, the cost for computing the amplitude value can be reduced based on the lookup table.

After the signal strength of the antennas A1-A6 is computed, in operation S320, the controller 120 determines which antennas have the larger signal strength among each antenna pair and chooses these antennas as indicated antennas. In some embodiments, for the antenna pair, the antenna A1 and A4, the signal of the antenna A1 has larger signal strength than that of the antenna A4. Similarly, the signal of the antenna A2 has larger signal strength than that of the antenna A5. The signal of antenna A3 has larger signal strength than that of the antenna A6. Accordingly, the antenna A1, the antenna A2, and the antenna A3 are the three indicated antennas. That is to say, the controller 120 can make a preliminary decision that the antennas A1-A3 locate on the side close to a signal source. In the following steps of signal processing, only the signals of the indicated antennas are processed. Accordingly, some unnecessary signal processing can be eliminated, such that the positioning speed is increased.

In operation S330, the controller 120 determines whether the plurality of indicated antennas are consecutive antennas. For example, the antennas A1-A3 are consecutive antennas among the antennas A1-A6 which are circularly disposed with an equal interval between each other.

If the antennas A1-A3 are determined to be consecutive antennas in operation S330, the controller 120 computes the signals of each two of the indicated antennas to obtain a plurality of composite signals in operation S340. For example, the controller 120 computes the amplitude of the composite signal of two of the indicated antennas according to formula 3 and formula 4.

$$\text{Amplitude}_{AiAj} = (I_{Ai} + I_{Aj})^2 + (Q_{Ai} + Q_{Aj})^2 \quad \text{(formula 3)}$$

$$\text{Strength}_{AiAj} = \text{Amplitude}_{AiAj}{}^2 / \text{Resistance} \quad \text{(formula 4)}$$

In formula 3, $\text{Amplitude}_{AiAj}$ is a composite amplitude of two of the indicated antenna Ai and Aj, where $1 \leq i, j \leq 6$.

In formula 4, $\text{Strength}_{AiAj}$ is a signal strength which is computed according to the composite amplitude $\text{Amplitude}_{AiAj}$. In some embodiments, the controller 120 searches the lookup table according to the value I and the value Q to obtain the amplitude in formula 3.

For example, the controller 120 applied formula 3 to compute the composite amplitude $\text{Amplitude}_{A1A2}$ of the composite signal of the antennas A1 and A2, the composite amplitude $\text{Amplitude}_{A2A3}$ of the composite signal of the antennas A2 and A3, and the composite amplitude $\text{Amplitude}_{A1A3}$ of the composite signal of the antennas A1 and A3. Furthermore, the strength of the composite signals, $\text{Strength}_{A1A2}$, $\text{Strength}_{A2A3}$, and $\text{Strength}_{A1A3}$, are computed according to formula 4.

Furthermore, the controller 120 computes a phase difference of the composite signal of two of the indicated antennas according to formula 5 and a phase angle of the composite signal of two of the indicated antennas according to formula 6.

$$\text{Phase}_{AiAj} = (\tan^{-1})^2\left(\frac{Q_{Ai} + Q_{Aj}}{I_{Ai} + I_{Aj}}\right), -\pi \leq \text{Phase}_{AiAj} \leq \pi \quad \text{(formula 5)}$$

$$\text{Angle}_{AiAj} = \sin^{-1}\left(\text{Phase}_{AiAj} \cdot \left(\frac{\lambda}{2\pi d}\right)\right) \quad \text{(formula 6)}$$

In formula 5, $\text{Phase}_{AiAj}$ is the phase difference of the composite signal of two of the indicated antennas Ai and Aj, where $1 \leq i, j \leq 6$. In some embodiments, the controller 120 searches the lookup table according to the value I and the value Q to obtain the phase difference in formula 5.

In formula 6, $\text{Angle}_{AiAj}$ is the phase angle which is computed according to the phase difference of the composite signal. The parameter $\lambda$ is a wavelength, and the parameter d is a baseline length between the antennas. In some embodiments, the controller 120 searches the lookup table according to the phase difference to obtain the phase angle in formula 6. It should be noted that the formulas described above are shown for illustration, and the formulas are not limited herein. A person with ordinary skill in the art can modify the computations and/or parameters of the formulas based on practical demands to meet the actual situation.

In operation S350, when the controller 120 determines that the indicated antennas are consecutive, the controller 120 uses, according to the indicated antenna whose baseline length is smaller than a threshold length, the largest composite signal of the indicated antennas to compute a coarse angle. For example, the baseline length between the indicated antennas A1 and A2 is 0.477λ. The baseline length between the indicated antenna A2 and A3 is 0.477λ. The baseline length between the indicated antenna A1 and A3 is 0.75λ. In some embodiments, the threshold length is 0.5λ. The controller 120 uses the composite signal of the indicated antennas A1 and A2 whose baseline length is smaller than the threshold length and the composite signal of the indicated antennas A2 and A3 whose baseline length is smaller than the threshold length to compute the coarse angle.

When the controller 120 performs operation S350, in some embodiments, the controller 120 determines that the signal strength of the composite signal of the antennas A1 and A2 is larger than the signal strength of the composite signal of the antennas A2 and A3, the controller 120 uses the phase difference of the composite signal of the antennas A1 and A2 to compute the phase angle. The phase angle is taken as the coarse angle. In some other embodiments, when the controller 120 determines that the signal strength of the composite signal of the antennas A2 and A3 is larger than the signal strength of the composite signal of the antennas A1 and A2, the controller 120 uses the phase difference of composite signal of the antennas A2 and A3 to compute the phase angle. The phase angle is taken as the coarse angle.

In operation S360, the controller 120 uses the composite signal of the indicated antennas to compute a plurality of phase angles and transforms the plurality of phase angles into a plurality of global angles according to an initial angle. In some embodiments, as shown in FIG. 4, a normal vector N12 is a vector which is vertical to the baseline between the antennas A1 and A2, a normal vector N22 is a vector which is vertical to the baseline between the antennas A2 and A3, and a normal vector N13 is a vector which is vertical to the baseline between the antennas A1 and A3. The distance between each two of the antennas A1-A6 is known, and the position of the antennas A1-A6 is known. When an angle of one of the composite vectors is set to be an initial angle and angles of other composite vectors are computed relative to the initial angle, the global angles are obtained.

For example, the controller 120 sets the angle of the composite signal of the antennas A1 and A2 as the initial angle in a top-view direction (e.g., 0°). The transformed angle is the global angle θ+0°. The angle θ is the angle between the normal vector of the baseline of each antenna and the line of sight. The angle of the composite signal of the antennas A1 and A3 is transformed by the angle θ1, and the global angle is θ+θ1. The angle of the composite signal of the antennas A2 and A3 is transformed by the angle θ2, and the global angle is θ+θ2. In some embodiments, the angle θ1 is 30°, and the angle θ2 is 60°. Accordingly, the phase angle of each antenna signals can be transformed into the same coordinate system (i.e., the phase angles can be represented in the same coordinate system), and the angle normalization is performed.

It should be noted that, in some embodiments, the baseline length between the antennas A1 and A3, 0.75λ, is larger than 0.5λ. The baseline length between the antennas A1 and A3 is larger than other baseline lengths, so the composition signal of the antennas A1 and A3 is used to compute multiple phase angles. Accordingly, the multiple global angles of the composite signal of the antennas A1 and A3 can be also obtained in operation S360.

In operation S370, the controller 120 computes a difference between the multiple global angles of the composite signal and the coarse angle of the composite signal respectively to output the global angle which is relative to the minimal difference, such that the outputted global angle is taken as a positioning angle. For example, as described above, the multiple global angles can be computed by the composite signal of the antennas A1 and A3. If the controller 120 determines that the signal strength of the composite signal of the antennas A1 and A2 is larger than that of the antennas A2 and A3, the controller 120 sets the phase angle of the antennas A1 and A2 as the coarse angle. The controller 120 subtracts the coarse angle from the multiple global angles of the antennas A1 and A3 respectively and gets multiple degree differences. In some other embodiments, the multiple degree differences are obtained by computing the differences between the multiple global angles of the antennas A1 and A2 and the multiple global angles of the antennas A1 and A3 respectively. Subsequently, the smallest one of the multiple differences or the difference which is smaller than a default threshold is determined, such that the global angle which is the closest angle relative to the coarse angle is obtained.

In some embodiments, the multiple differences described above are the differences between two values or the absolute values of the differences between the two values. Accordingly, the method for determining the smallest degree difference of the angles can provide, among the multiple global angles, the angle which is the closest one to the signal source. In one embodiment, the multiple global angles of the composite signal of the antennas A1 and A3, which have the larger baseline length, are computed first. The closest angle to the signal source is chosen from the global angles of the antennas A1 and A3 according to the composite signal of the antennas A1 and A2, which have the larger signal strength.

Reference is made again to operation S330. If the indicated antennas are not consecutive antennas determined in operation S330, operation S380 is performed. In operation S380, the controller 120 computes the signals of each two of the indicated antennas to obtain a plurality of composite signals. The controller 120 uses the plurality of composite signals of the indicated antennas to compute a plurality of phase angles, such that the plurality of phase angles are taken as the positioning angles. The positioning angles are described below.

Reference is made again to FIG. 4. In some embodiments, the antennas A1, A3, and A5 are determined to be the indicated antennas in operation S330. The strength of the composite signal of the antennas A1 and A3, the strength of the composite signal of antennas A3 and A5, and the strength of the composite signal of antennas A1 and A5 are computed respectively by applying formula 3 and formula 4 described above. The phase angle of the composite signal of the antennas A1 and A3, the phase angle of the composite signal of the antennas A3 and A5, and the phase angle of the composite signal of the antennas A1 and A5 are computed respectively by applying formula 5 and formula 6 described above. The controller 120 determines the composite signal which has the largest signal strength. For example, the signal strength of the composite signal of the antennas A3 and A5 is the largest among others.

In some embodiments, because the baseline length between the antennas A1 and A3, the baseline length between the antennas A3 and A5, and the baseline length between the antennas A1 and A5 are 0.75λ, (larger than the threshold length 0.5λ), the controller 120 cannot compute the only one phase angle from the composite signal of the antennas A1 and A3, the composite signal of the antennas A3 and A5, and the composite signal of the antennas A1 and antenna A5 respectively (i.e., there are multiple results (phase angles)). Accordingly, after the controller 120 determines the composite signal whose signal strength is larger than the signal strength of other composite signals, the controller 120 uses the determined composite signal to compute the multiple phase angles, such that the computed multiple phase angles are taken as the positioning angles.

For example, the multiple phase angles obtained from the composite signal of the antennas A3 and A5 are taken as the positioning angles.

It should be noted that, in operation S380, because there is no process of computing the coarse angle, the process of filtering the multiple phase angles is eliminated and the process of the angle normalization for the multiple phase angles is also eliminated. Instead, the phase angle is taken as the positioning angle.

Consequently, the difference between operation S380 and S330 is that, in operation S330, the determination whether the indicated antennas are consecutive is made. When the determination that the indicated antennas are consecutive is made, some baseline lengths are smaller than 0.5λ. Therefore, there is only one phase angle to be computed and taken as the coarse angle. The coarse angle is applied for filtering the multiple phase angles of another composite signal, so the phase angle which is closest to the coarse angle can be obtained.

In some embodiments in FIG. 4, the baseline length between the antennas A1 and A2 is 0.433λ, and the baseline length between the antennas A1 and A3 is 0.75λ. The two values, 0.433λ and 0.75λ, are mutual non-harmonic, non-integral-multiple, and co-prime numbers. Accordingly, the multiple phase angles (which are more accurate degrees) are filtered according to the coarse angles (which are less accurate degrees), so that the accurate phase angle is obtained.

Figure 5:
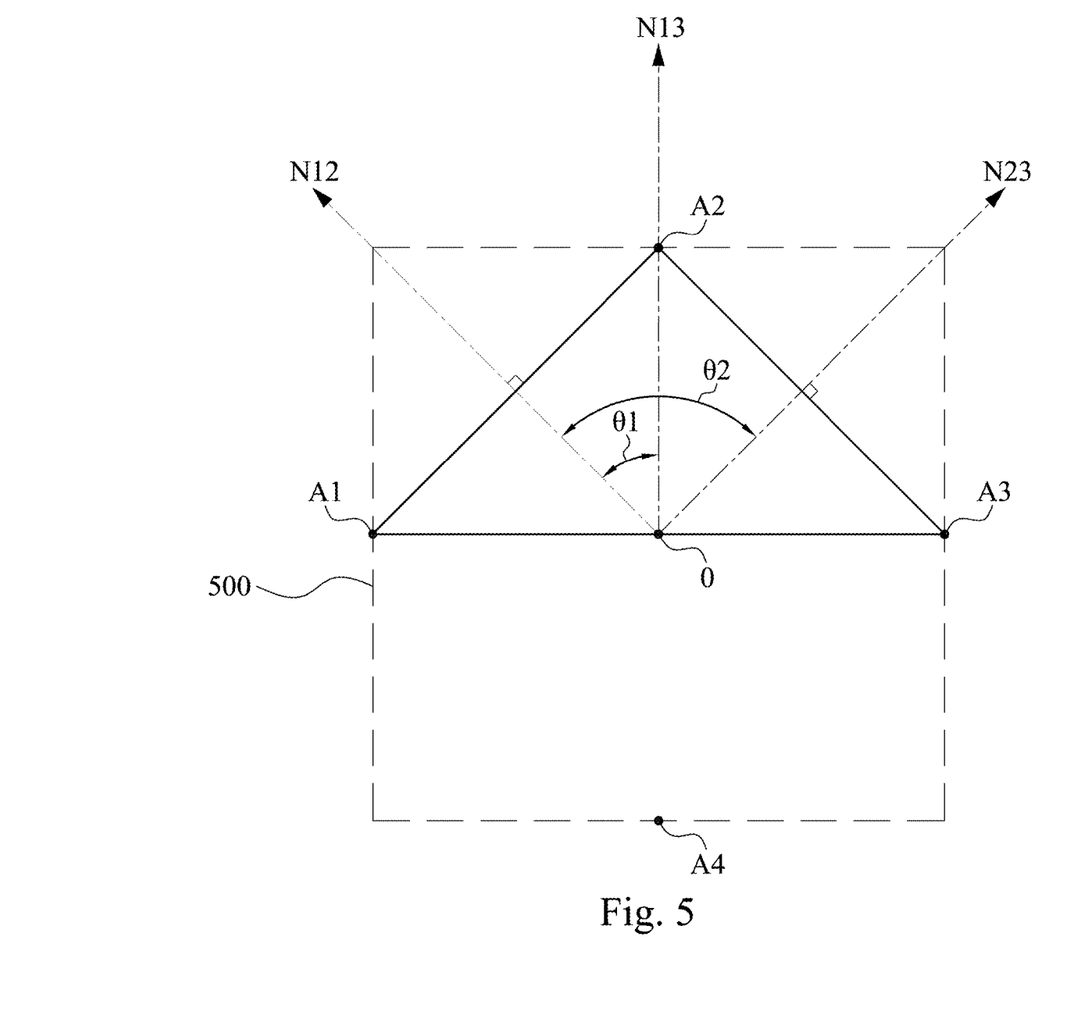
FIG. 5 is a block diagram illustrating an antenna arrangement that the antennas execute the positioning method in FIG. 3 according to some other embodiments of the present disclosure.

Reference is made to FIG. 5, which is a block diagram illustrating an antenna configuration that the antennas execute the positioning method 300 in FIG. 3 according to some other embodiments of the present disclosure. As shown in FIG. 5, the four antennas are arranged circularly. A square 500 includes four edges with length λ/2. The antennas A1-A4 are disposed at a center of each edge of the square 500 respectively. The antennas A1-A4 surround the reference point O and are arranged with an equal interval between each other to form the circular arrangement. The distances between any two adjacent antennas at the square 500 are equal and the distance between any antenna and the reference point O are equal because of the characteristic of the square 500. For example, the distances between the antennas A1 and A2, the antennas A2 and A3, the antennas A3 and A4, and the antennas A4 and A1 are equal. Similarly, the distance between the antenna and the reference point O are equal. For example, the distance between the antenna A1 and the reference point O, the antenna A2 and the reference point O, the antenna A3 and the reference point O, and the antenna A4 and the reference point O are equal.

In some embodiments, based on the geometric feature of the square 500, the baseline length between the antennas A1 and A2 (i.e., the distance between the antennas A1 and A2), the baseline length between the antennas A2 and A3 (i.e., the distance between the antennas A2 and A3), the baseline length between the antennas A3 and A4 (i.e., the distance between the antennas A3 and A4), and the baseline length between the antennas A1 and A4 (i.e., the distance between the antennas A1 and A4) are 0.3536λ.

In some embodiments in FIG. 5, when the signals of the antennas A1-A4 are used to perform the positioning method 300, the indicated antennas are consecutive for sure in operation S330. For example, in operation S310 and operation S320, when the signal strength of the antenna A1 is larger than the signal strength of the antenna A3 and when the signal strength of the antenna A2 is larger than the signal strength of the antenna A4, the indicated antennas are the antenna A1 and the antenna A2. In some embodiments, when the global angles are transformed in operation S360, the angel θ1 is set as 45° and the angle θ2 is set as 90° based on the geometric feature of the square. Afterward, similar to the above description, operations S340-S370 are performed to obtain the positioning angle. A similar description is referred to as the description above and will be omitted here for the sake of brevity.

The examples of the antenna arrangement are made by the square (FIG. 5) and the regular hexagon (FIG. 4) in the present disclosure. However, the antenna arrangement is not limited to the examples and the antenna arrangement of any regular polygon can be applied in the present disclosure.

Accordingly, the wireless devices 100 and 200 and the positioning method 300 provided in the present disclosure can solve the two problems. First, when the baseline length of the antennas is smaller than 0.5λ, the only one result can be obtained, though, the positioning accuracy is low. Second, when the baseline length of the antennas is not smaller than 0.5λ, the positioning accuracy is high, though, the multiple phase angles cause a problem to determine the positioning angle. In the present disclosure, the only one phase angle with lower accuracy (i.e., the coarse angle) is applied to filter the multiple phase angles, which have higher accuracy, so that the phase angle which has the smallest included angle with the coarse angle can be determined. Accordingly, the high accuracy positioning angle is obtained, so that the accurate positioning process is provided.

It will be apparent to those skilled in the art that various modifications and variations can be made to the structure of the present disclosure without departing from the scope or spirit of the disclosure. Given the foregoing, it is intended that the present disclosure cover modifications and variations of this disclosure provided they fall within the scope of the following claims.

What is claimed is:

1. A wireless device, comprising:
an antenna circuit, comprising a plurality of antennas, wherein each of the plurality of antennas is configured to surround a reference point and arrange with an equal interval between each other; and
a controller coupled to the antenna circuit and configured to:
compute a strength of a signal of each of the plurality of antennas to choose a plurality of indicated antennas from the plurality of antennas, wherein a distance of each two of the plurality of indicated antennas is a baseline length;
compute the signal of each two of the plurality of indicated antennas to obtain a plurality of composite signals; and
compute a plurality of phase angles according to the plurality of composite signals to compute a positioning angle by using the plurality of phase angles;
wherein, when the plurality of indicated antennas is consecutive, the controller is further configured to:
compute a coarse angle by using a largest composite signal of the plurality of indicated antennas that the baseline length of the plurality of indicated antennas is smaller than a threshold length and compute the plurality of phase angles by using the plurality of composite signals of the plurality of indicated antennas whose baseline length is not smaller than the threshold length;
transform the plurality of phase angles into a plurality of global angles according to an initial angle;
compute a difference between the plurality of global angles and the coarse angle respectively; and
output the global angles corresponding to a smallest difference and take the global angles outputted as the positioning angle.

2. The wireless device of claim 1, wherein the plurality of antennas comprises a plurality of antenna pairs, and the reference point is located at a center point between the antennas of each antenna pairs, wherein the controller is further configured to:
choose the plurality of antennas among the plurality of antenna pairs having a larger strength to be the plurality of indicated antennas.

3. The wireless device of claim 1, wherein the controller is further configured to:
when the plurality of indicated antennas being not consecutive, compute the plurality of phase angles by using the plurality of composite signals of the plurality of indicated antennas whose baseline length is not smaller than the threshold length.

4. A positioning method, configured for a plurality of antennas surrounding a reference point and arranging with an equal interval between each other, wherein the positioning method comprises:
computing a strength of each of the plurality of antennas to choose a plurality of indicated antennas from the plurality of antennas, wherein a distance of each two of the plurality of indicated antennas is a baseline length;
computing the signal of each two of the plurality of indicated antennas to obtain a plurality of composite signals; and
computing a plurality of phase angles according to the plurality of composite signals to compute a positioning angle by using the plurality of phase angles;
wherein, when the plurality of indicated antennas is consecutive, the positioning method further comprises:
computing a coarse angle by using a largest composite signal of the plurality of indicated antennas that the baseline length of the plurality of indicated antennas is smaller than a threshold length and computing the plurality of phase angles by using the composite signals of the plurality of indicated antennas whose baseline length is not smaller than the threshold length;
transforming the plurality of phase angles into a plurality of global angles according to an initial angle;
computing a difference between the plurality of global angles and the coarse angle respectively; and
outputting the global angles corresponding to a smallest difference and taking the global angles outputted as the positioning angle.

5. The positioning method of claim 4, wherein the plurality of antennas comprises a plurality of antenna pairs, and the reference point is located at a center point between the antennas of each antenna pairs, wherein the positioning method further comprises:
choosing the plurality of antennas among the plurality of antenna pairs having a larger strength to be the plurality of indicated antennas.

6. The positioning method of claim 4, wherein the positioning method further comprises:
when the plurality of indicated antennas being not consecutive, computing the plurality of phase angles by using the plurality of composite signals of the plurality of indicated antennas whose baseline length is not smaller than the threshold length.

\* \* \* \* \*